United States Patent [19]

Masson

[11] 4,217,620
[45] Aug. 12, 1980

[54] CIRCUIT FOR CONTROLLING INDUCTION IN CURRENT TRANSFORMERS

[75] Inventor: Louis Masson, Ste-Julie, Canada
[73] Assignee: Hydro-Quebec, Montreal, Canada
[21] Appl. No.: 942,951
[22] Filed: Sep. 18, 1978
[30] Foreign Application Priority Data
Feb. 6, 1978 [CA] Canada .................................. 296342
[51] Int. Cl.² .......................... H02H 3/20; H02H 7/04
[52] U.S. Cl. ........................................ 361/58; 323/60; 323/6
[58] Field of Search ....................... 361/58, 35, 36, 86, 361/90, 88, 93, 139; 323/60, 61, 6, 44 R, 48, 50, 89 R, 89 P, 94 R, 97; 363/75; 336/30, 155, 165

[56] References Cited
U.S. PATENT DOCUMENTS

| 3,510,675 | 5/1970 | Johnson et al. | 323/44 R |
| 3,875,493 | 4/1975 | Kunzinger et al. | 323/60 X |
| 4,096,363 | 6/1978 | Earp | 323/6 X |

Primary Examiner—Patrick R. Salce
Attorney, Agent, or Firm—Schwartz, Jeffery, Schwaab, Mack, Blumenthal & Koch

[57] ABSTRACT

The present invention is directed to a circuit for controlling induction in current transformers so as to maintain such induction at a level below its saturation level in presence of a primary current having an asymetric component. The control circuit comprises a detection part connected to the secondary of the current transformer for detecting an increase in the transformer induction; an auxiliary load of high resistive value at the secondary of the transformer; and a switching part governed by the detection part operative to insert the auxiliary load in series with the secondary of the transformer when the polarity of the secondary wave reaches a polarity inverse with respect to the asymetrical component of the primary current.

24 Claims, 12 Drawing Figures

CIRCUIT FOR CONTROLLING INDUCTION IN CURRENT TRANSFORMERS

The present invention relates to controlling induction levels in current transformers and more particularly concerns a control circuit able to maintain that induction below its saturation level, through a controlled insertion of a load having a high resistive value at the secondary of a current transformer.

In many instances, saturation in current or intensity transformers has caused misoperation of protection systems used in electric power transmission lines.

That problem of saturation of current transformers is not novel as such and many solutions have been hitherto proposed at least to reduce its odd effects. As practical solutions, there have been proposed the overdimensioning of transformer cores, the setting of air gaps, the reduction of loads connected to the secondary of those transformers, and so on. The overdimensioning of cores and the reduction of loads are technically considered as of interest but are rather uneconomical on the whole. On the other hand, the introduction of an air gap eliminates well the remanence phenomenum and thus allows a better utilization of the iron core, but saturation always remains a possibility.

Furthermore, the set-up of longer and longer energy transmission lines has rendered more acute that problem of saturation in current transformers mainly due to the corresponding rise in time constants directly linked to the length of those transmission lines. Such increases in time constants create, when in transitory operation, a saturation of the transformer core which rises with time due to the presence of asymetrical waves at its primary, those waves then affecting the transformer capacity due to their lasting time and their intensity.

The present invention therefore advocates a control circuit capable of governing the induction level of current transformers, of maintaining the latter level below that of saturation, and thus of increasing the linear dynamic range of the induction, and this by a substantial value, while avoiding the operation problems caused by such saturation in current transformers.

For this purpose, the induction control circuit according to the present invention, comprises detection means mounted at the secondary of a current transformer connected to a nominal load, for detecting the amplitude of a current or voltage parameter corresponding to the value of the induction in the current transformer; an auxiliary load of a high resistive value connected at the secondary of the transformer; and a switching means under the control of the detection means and operative to insert said auxiliary load in series with the nominal load when the current polarity across the switching means becomes inverse of that of the asymetrical component of the primary or secondary current in the current transformer.

Preferred embodiments of the present invention will be hereinafter described with reference to the accompanying drawing, wherein.

Figure 6:
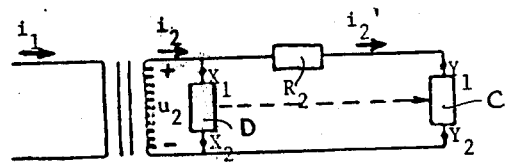
Figure 7:
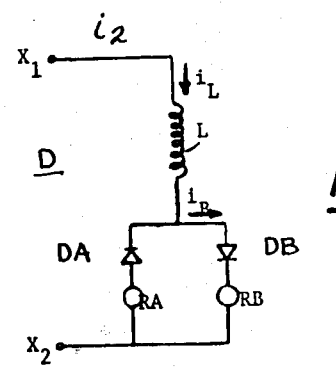
Figure 8:
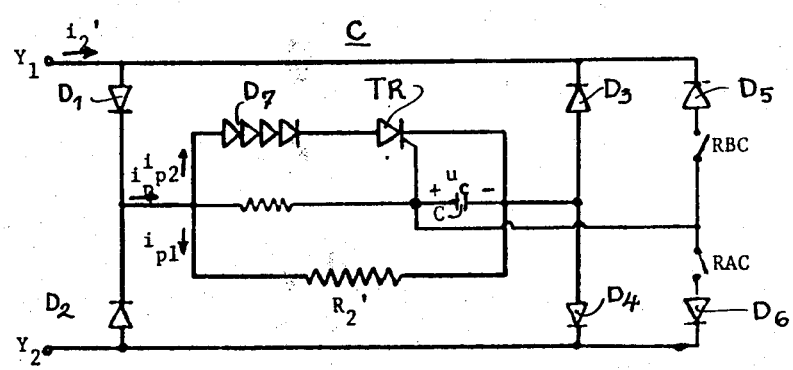
Figure 9:
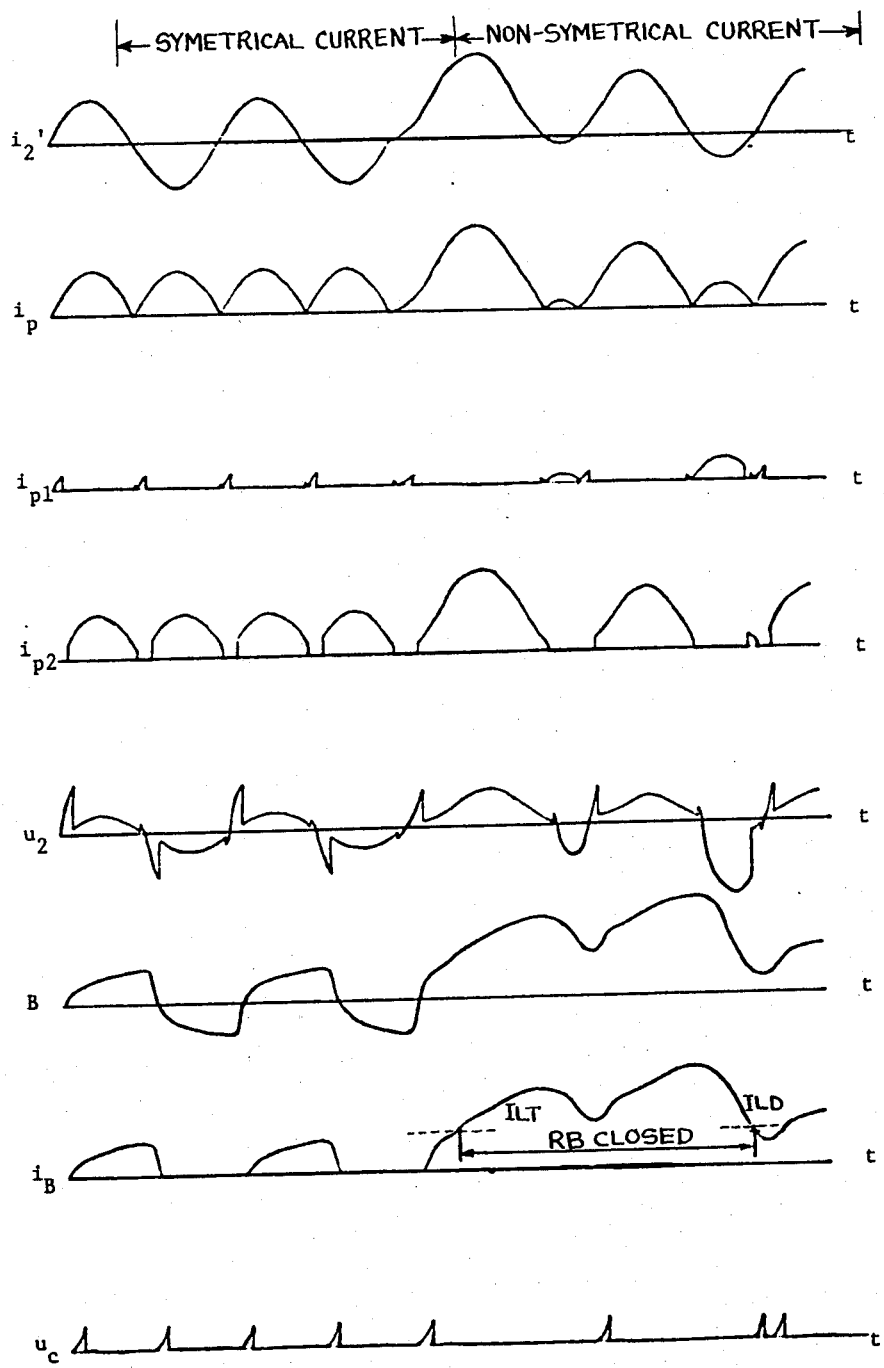
Figure 10:
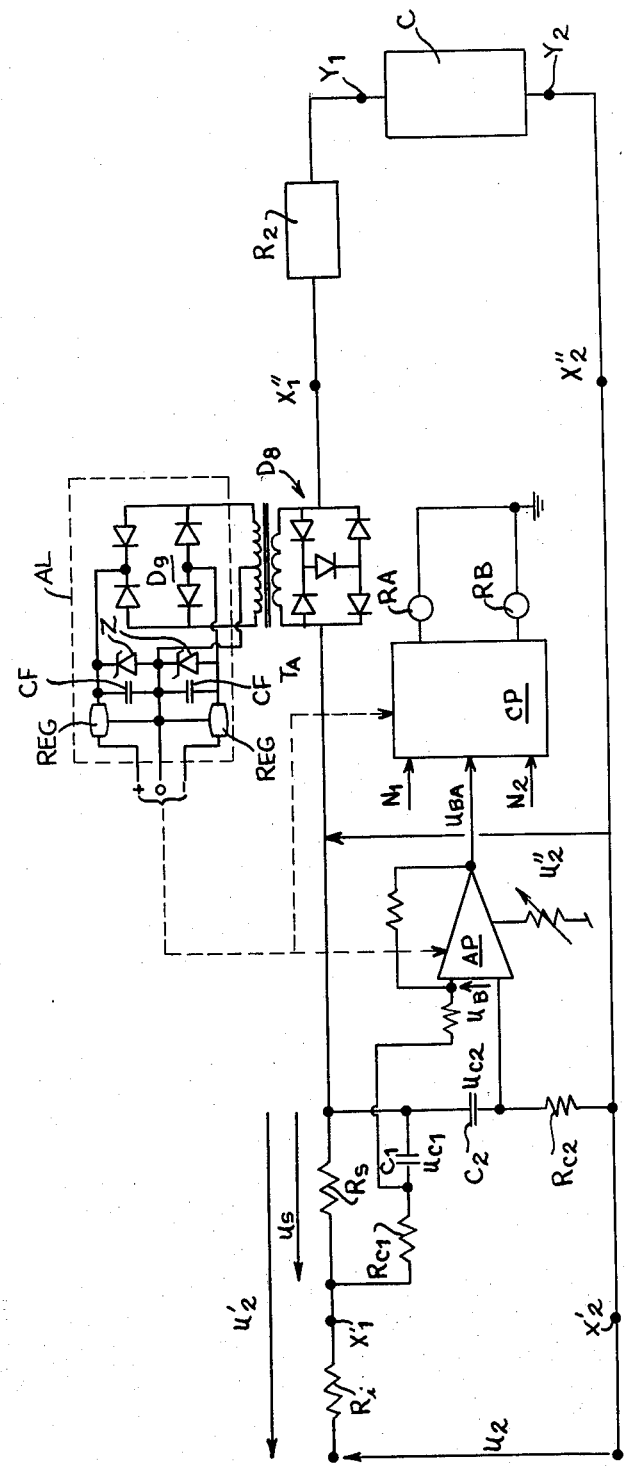
Figure 11:
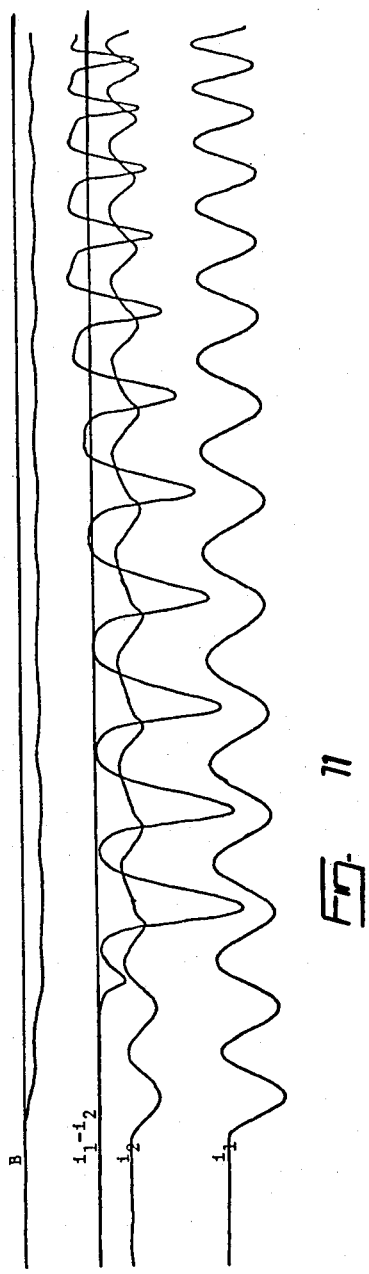

FIG. 6 schematically illustrates the control circuit mounted at the secondary of a current transformer;

FIG. 7 represents the detection part of the control circuit of FIG. 6;

FIG. 8 shows the switching part of the control circuit of FIG. 6 for the insertion of a high resistive value load in series with the nominal load;

FIG. 9 shows waveforms related to the operation of the control circuit of FIG. 6;

FIG. 10 illustrates a further embodiment of the detection part of the control circuit of FIG. 6;

FIG. 11 presents waveforms obtained through tests without control circuit; and

Figure 12:
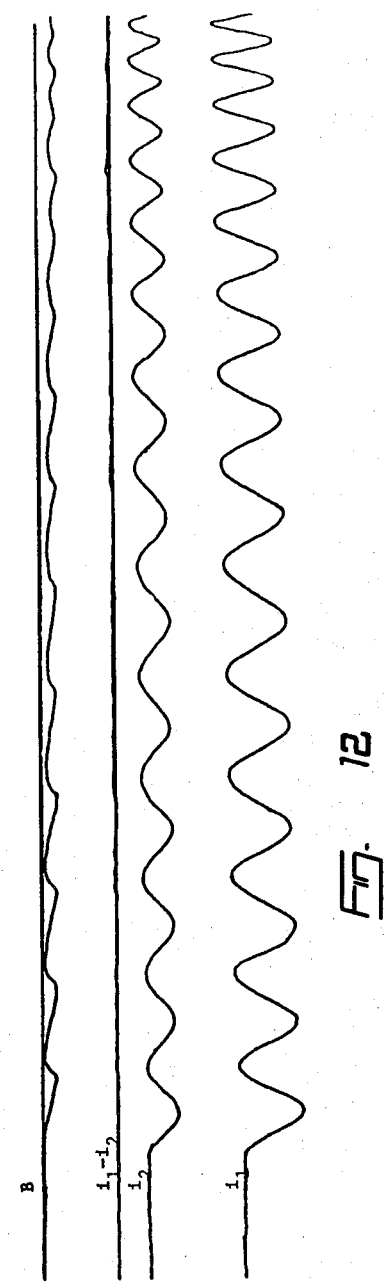

FIG. 12 shows waveforms obtained through the use of the control circuit in accordance with the present invention.

Figure 1:
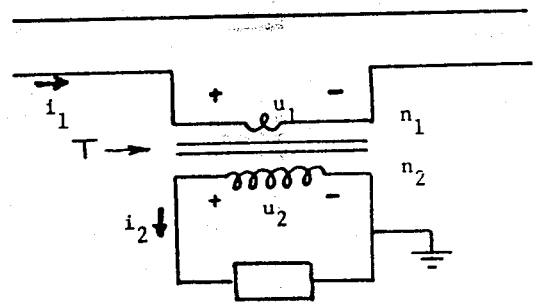
FIG. 1 shows a current transformer having its primary connected to an energy transmission line and its secondary to a nominal load.

In FIG. 1, there is illustrated a current transformer T connected in series with an energy transmission line through which flows a current $i_1$ across the primary winding of the transformer T having $N_1$ turns. The potential $u_1$ thereby produced induces a potential drop $u_2$ across the $N_2$ turns of the secondary winding, then establishing a current $i_2$ through the nominal load C connected across the transformer secondary.

It should be noted here that the operation of a current transformer is substantially governed by the same basic principles as for a power transformer. There however exist some differentiating characteristics as, for example, the fact that the current transformer is mounted in series with a circuit which is normally not affected by the presence of the transformer. The primary of the current transformer being at a low impedance is thoroughly crossed by the primary current $i_1$ to induce, at the secondary, current $i_2$ and voltage $u_2$ having the following value:

$u_2 = a\, u_1$ $i_2 = i_1/a$ where $a = n_2/n_1$

However, a further analysis of the current transformer behavior shows that the above relations do not strictly stand in practice. That behavior is best defined in the simplified equivalent electric circuit shown in FIG. 2. In this equivalent circuit, the following meaning for the currents, voltages and components has been adopted:

$i_1$: the primary current reduced to its secondary value in accordance with the transformer-turns ratio;

$i_2$: the secondary current;

$i_0$: the magnetization current of the magnetic circuit;

$L_0$: the impedance of the magnetizing branch;

$R_2$: the resistance of the secondary winding, wiring and load;

$L_2$: the inductance of the secondary winding, the wiring and the load;

$u_2$: the secondary voltage of the current transformer.

It is to be noted that the value of $L_0$ varies in accordance with the permeability of the iron core, which is determined by the induction level, for a given type of iron.

Figure 3:
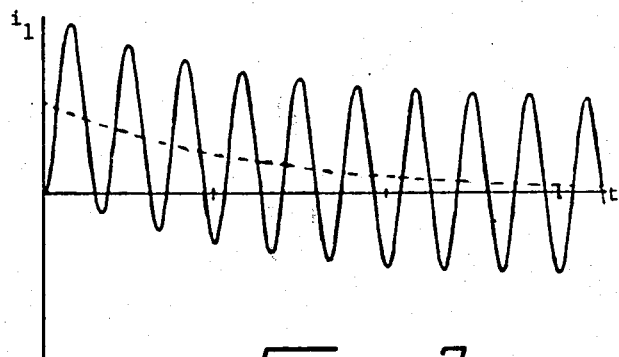
FIG. 3 shows a waveform of an asymetrical current present at the primary of the current transformer of FIG. 1.

In normal operation, that is when a constant sinusoidal current is applied to the primary of the current transformer, no saturation occurs in the latter since within the normal performance ratings. However, in transient operation, the waveform of the primary current $i_1$, which is to be transformed adequately by the current transformer, is generally constituted of an aperiodical or asymetrical component and a periodical component. In the worst case, that current which is illustrated in FIG. 3 takes the following form:

$$i_1 = I_1(e^{-t/\tau_1} - \cos \omega t)$$

where
$I_1$: amplitude of the current $i_1$
$\tau_1$: time constant of the primary network;
$\omega$: pulsation of current $i_1$, which is $2\pi f$.

Figure 2:
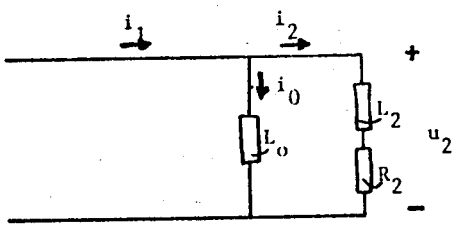
FIG. 2 illustrates an equivalent circuit of the current transformer of FIG. 1.

Assuming $L_0$ very large and $L_2$ very low, the following relations may be made in connection with the equivalent circuit shown in FIG. 2:

$$i_2 \approx i_1$$
$$u_2 = R_2 i_2$$
$$B = (1/NA) \int u_2 dt$$

where
B: Density of flux in the current transformer core;
A: Cross-section of the current transformer core.
It then follows:

$$B = (1/NA) \int R_2 i_1 dt$$

It is therefore seen that a variation in the induction or the flux density B in the transformer core is proportional to the integral of the voltage across the nominal load terminals.

Figure 4:
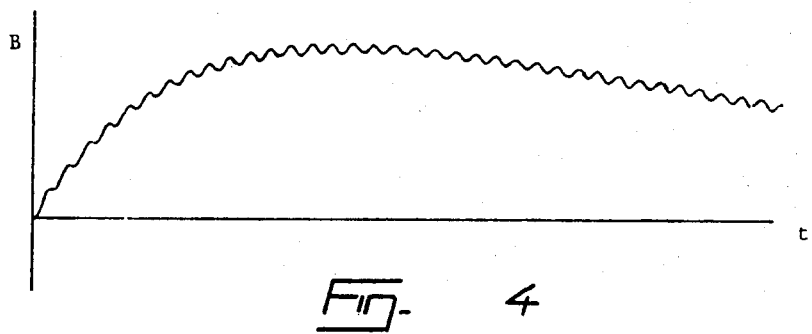
FIG. 4 depicts the induction value set in the current transformer by the asymetrical current of FIG. 3.

That variation in the induction or flux density B in the transformer core behaves as illustrated in FIG. 4, when subjected to the asymetrical current $i_1$ of FIG. 3. The induction B may then be mathematically defined as follows:

$$B = \frac{I_1 R_2}{Na\omega} \left[ \frac{\tau_2 \tau_1}{\tau_2 - \tau_1} \omega \left( e^{-t/\tau_2} - e^{-t/\tau_1} \right) - \sin \omega t \right]$$

where $\tau_2$ represents the characteristic time constant of the current transformer.

The above relation is valid for $\tau_2 > \tau_1$ and in the case of a purely resistive load, which is the worst condition of operation. The time constant $\tau_2$ of the transformer has then the value $L_0/R_2$.

Although the initial flux density is shown as nul in FIG. 4, that density may of course be different from 0 due to the presence of transitory residual or remanent flux.

Referring to the above relation, it is seen that the variation in the induction of the transformer core has a double exponential component as a result of the asymetrical character of the primary current. The amplitude of that variation depends on the amplitude of the fault current $i_1$ at the primary, of the network time constant $\tau_1$, of the characteristic time constant of the current transformer $\tau_2$ and of the value of the load $R_2$, from the equivalent circuit of FIG. 2. It is noted that the graph of FIG. 4 is held valid as long as the flux density B is under the saturation level of a transformer. However, in some operating conditions, for example when the asymetrical component of the primary current is of a high amplitude, the flux density does reach the saturation level. The secondary current $i_2$ is then distorted, which distortion is caused by the weakening of the magnetization impedance $L_0$ (FIG. 2) when the iron material forming the core is saturated. A substantial increase in current $i_0$, with loss in $i_2$, is then noted, current $i_1$ being obviously not affected by the saturation.

Up till now, most of the efforts made to avoid saturation have been directed to modifying either section A of the current transformers, the value of resistance $R_2$ or the level of the residual flux of those transformers. Those solutions essentially reside in the limitation of the amplitude of the flux density B given in the above relation to a value below that of saturation according to the material used, which is usually made of oriented-grain iron (alloys of Fe Si, cold-rolled) which is characterized a density of flux at saturation of about 18,000 Gauss.

On the other hand, the above analysis of the behavior of the induction in a current transformer when subjected to an asymetrical primary current, suggests a method for controlling the induction which is based on the concept of varying the load resistance connected through the transformer secondary, this concept serving as a basis for the achievement of the control circuit in accordance with the present invention. Accordingly, the instant control circuit operates such as to insert a load of high resistance in series with the current transformer secondary at the instant where asymetry is detected in one of the current or voltage parameters, that is when the polarity of that parameter becomes reverse with respect to the polarity of the asymetrical component. As will become apparent through the description of FIGS. 6 to 8, the insertion of that high value resistance is performed by means of a switch mounted in parallel therewith.

Figure 5:
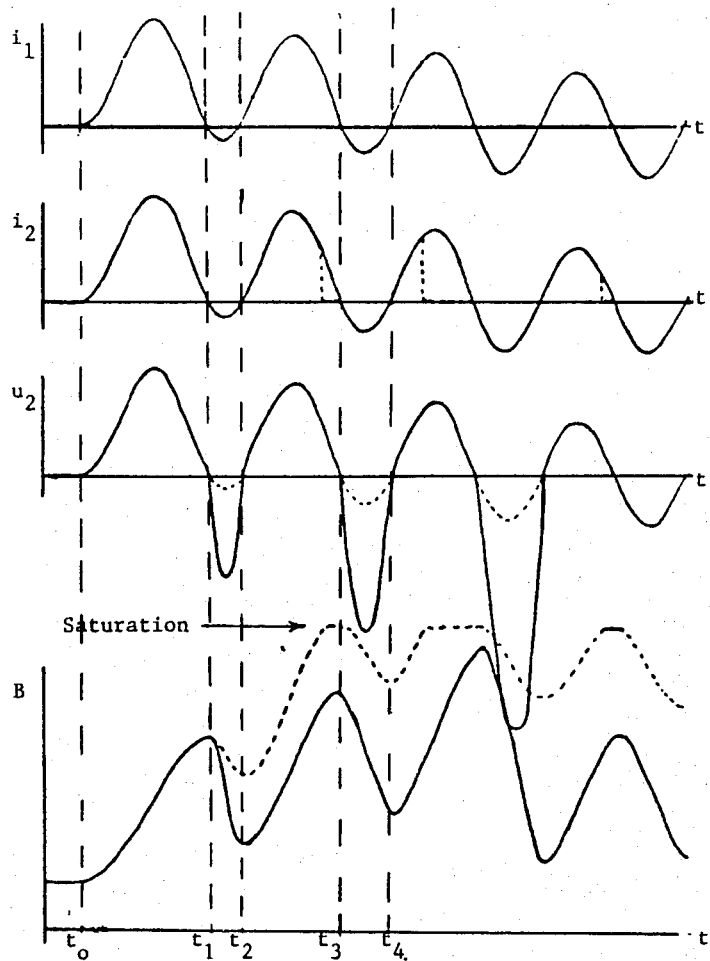
FIG. 5 shows various waveforms of current, voltage and induction, with and without the control circuit advocated in the present invention.

FIG. 5 graphically illustrates the above concept by showing an asymetrical primary current $i_1$ whose asymetrical component is positive. The current $i_1$ is here drawn out at the same scale than at the secondary. In the absence of saturation, current $i_2$ is identical to $i_1$. That current $i_2$ which flows through the load $R_2$ (FIG. 2) creates a voltage $u_2$ the integration of which gives, safe a constant, the density value of induced flux B. In FIG. 5, it is to be noted that the dotted lines show the waveforms obtained without an induction circuit control whereas the unbroken lines show the waveforms obtained when a circuit control is used.

Let us consider first the variation in the current and in the induction for the time interval ranging from $t = t_0$ to $t = t_1$. In that interval, the induction increases steadily since being the integral of a positive wave. Upon detection of the asymetrical state of the current before the instant $t_1$ and upon insertion of a resistance $R_2'$ of a value higher than $R_2$ from $t_1$ to time $t_2$, the voltage $u_2$ will then be amplified during that time interval with respect to its actual value in the absence of such a resistance $R_2'$. Consequently, the induction B, being then the integral of an amplified negative voltage, decreases rapidly within the time interval $t_1-t_2$. Subsequently, at time $t_2$, the control circuit reacts so as to set that resistance $R_2'$ in parallel since then induction B has returned to a level equal to the initial level or to a level below that it should have been without resistance $R_2'$. Then, in the time interval $t_2$ to $t_3$, the induction B, which is the integral of a positive voltage wave in this case, increases continuously to reach a higher value at time $t_3$ where the current and the voltage become nul. At the instant $t_3$, where the current or the voltage reverses polarity, the resistance $R_2'$ is reinserted in series with the transformer secondary; and so on until the asymetrical condition has completely faded. It is therefore seen that through the controlled insertion of the resistance $R_2'$ the maximum value of induction B is limited and thereby allows the maintaining of the flux density below the saturation level of the transformer core.

Furthermore, as can be seen from FIG. 5, experiments have proven that such a decreased in the amplitude travel of the core induction through the controlled insertion of a load $R_2'$ having a high resistive value, a substantial increase in the current transformer capacity by a factor of three to four times, in terms of its induction dynamic range. This fact is translated in obvious economic advantages when considering that the cost of a current transformer is directly linked to its transformation capacity as a result of the quantity of materials required to form its core section.

FIG. 6 illustrates an embodiment of the induction control circuit. This circuit is devised to control the insertion or switching of a high resistive value load in series through the secondary of the current transformer. FIGS. 7 and 8 respectively give minute details on the detection part D and the switching part C of the control circuit of FIG. 6.

As schematically illustrated in FIG. 6, the control circuit comprises a detection part D mounted in shunt on the secondary winding of the current transformer across terminals $X_1$-$X_2$, and switching part C coupled in series with the load resistance $R_2$ and the transformer secondary. A current $i_2'$ derived from current $i_2$ flows through the switching part C connected across terminals $Y_1$-$Y_2$. The dotted line present in FIG. 6 serves to illustrate the control action of the switching part by the detection part of the control circuit.

The detection circuit D is constituted of an inductance L of a high-quality factor and mounted in series with the parallel relay coils $R_A$ and $R_B$, being in series with a diode DA, DB. In accordance with the polarity of the secondary current $i_2$, the current $i_B$ flows to either one of the relay coils $R_A$ or $R_B$.

The current $i_L$ flowing through the inductance L may be expressed as follows:

$$i_L = (1/L) \int u_2 dt$$

It is to be noted that the above relation for $i_L$ is the same, safe a constant, as for B, previously indicated, in normal operation. Consequently, an increase in the current $i_L$ is translated into an increase of the integral of the voltage $u_2$ measured across the transformer terminals, and as a result, an increase in the transformer induction. The following relation is therefore obtained:

$$i_L = (1/L) N \cdot A \cdot B.$$

According to the intensity of the current $i_L$ flowing through the sensitive and fast relay coils $R_A$ or $R_B$, one of the contacts $R_{AC}$ or $R_{BC}$ (FIG. 8) will close to insert the resistance $R_2'$ of a high resistive value in series with the load resistance $R_2$. The tripping of either one of the contacts $R_{AC}$ and $R_{BC}$ will be performed only when the current $i_L$ or $i_B$ will reach a given threshold value $i_{LT}$ (FIG. 9) corresponding to a threshold induction $B_T$. The reopening of contact $R_{AC}$ or $R_{BC}$ will be effected only when the current $i_L$ or $i_B$ will return below a given value $i_{LD}$ which is, in practice, in the order of half of that of $i_{LT}$. In normal operation, that is in the absence of an asymetrical current, the current $i_L$ is held at a lower value $i_{LT}$ so that the contacts $R_{AC}$ and $R_{BC}$ are not then tripped by their respective relay coils.

The switching circuit D essentially shows a rectifying bridge circuit constituted of diodes $D_1$, $D_2$, $D_3$ and $D_4$ and wherein are mounted in parallel the resistance $R_2'$ and a thyristor TR connected in series with a set of diodes $D_7$. The firing of thyristor TR is in function of the value of voltage $u_C$ developed across the capacitance C coupled to the thyristor trigger. In normal operation, the current $i_P$ which corresponds to the rectified current $i_2'$ passes through the resistance $R_2'$. The voltage across the terminals of resistance $R_2'$ increases then rapidly with current $i_{p1}$, equal to $i_P$, and so does the voltage $u_C$ across the terminal of the capacitor C of the thyristor TR firing circuit. When the voltage $u_C$ reaches the thyristor firing level, the latter becomes conductive, thereby short-circuiting the resistance $R_2'$ the voltage of which then falls to a quasi-nul value. At the end of each half cycle, where the current $i_P$ is nearly nul, the diodes $D_7$ present a high impedance due to their non-linear characteristics so that the current $i_P$ is derived toward the resistance $R_2'$, thereby forcing the extinction of thyristor TR the current of which reaches a value lower than that necessary to maintain some into conduction. At the following half-cycle, the same sequence is repeated.

Whenever an asymetry is detected, one of the two contacts $R_{AC}$ or $R_{BC}$ is closed by the detection relay coil $R_A$ or $R_B$ respectively, according to the polarity of the asymetrical wave. The closing of one of those contacts, respectively coupled to diodes $D_5$ and $D_6$, results in preventing the voltage $u_C$ across the terminals of the capacitor C from reaching the firing level of the thyristor when the detected current is of a polarity opposite to that of the asymetrical component of the current $i_2'$. The current $i_P$ then flows through the resistance $R_2'$ during the complete half-cycle, creating across the terminals of $R_2'$ a high voltage drop which contributes to reduce the induction B in the current transformer core.

The arrangement of the switching part C of the control circuit, that is within a double rectifying bridge, is for the purpose of preventing that variations in the thyristor characteristics and its firing circuit affect in a different manner both polarities. Indeed, light differences in the characteristics or impedance viewed from the opposite polarities of the current could cause the establishment of a continuous component of the magnetization current sufficient to lead the current transformer into saturation.

It is to be noted that detection may equally well be effected by means of a resistance-capacitor circuit or a unit including an operational amplifier acting as an integrator or even more by means of a circuit capable of detecting differences in the successive cycles of the current. Indeed, in accordance with the concept of the present invention, any asymetry in the induction of the transformer core may be suitably detected by the voltage or current parameters present at the secondary of those current transformers.

The use of an R-C circuit for detecting the induction level offers numerous technical and economical advantages when compared with the use of the inductance L shown in FIG. 7 as a part of the detection part D of the control circuit. In this case, the voltage at the terminals of the capacitor of the R-C circuit corresponds then to the integral of the voltage across the terminal of that circuit and thereby constitutes a measure of the inductance.

However, in order to allow a measure of the induction, that R-C circuit should be connected in shunt with the voltage induced at the transformer secondary, behind the secondary winding impedances and the wiring between the transformer and the station where the control circuit is installed. This is obviously not possible at least as far as the secondary wiring resistance is concerned.

FIG. 10, which illustrates another embodiment of the detection part of the control circuit of FIG. 6, which part is connected to the transformer through terminals $X_1'-X_2'$, offers a practical solution to the above problem in advocating the insertion of a resistance $R_s$ at the current transformer secondary, that resistance $R_s$ allowing to obtain an image value of the potential drop in the internal resistances and wiring, designated by $R_i$, of the transformer. That resistance $R_s$ is generally of a low value in order not to introduce substantial supplementary loads at the transformer secondary. The voltage drop $u_s$ across the terminal of the resistance $R_s$ has the following expression:

$$u_s = \frac{R_s}{R_s + R_i} u'_2$$

On the other hand, the R-C circuit is formed by the resistance $R_{c1}$ in series with the capacitor $C_1$, mounted in parallel with the resistance $R_s$, and by the capacitor $C_2$ coupled in tandem with the resistance $R_{c2}$ through which a voltage drop $u_2\Delta$ is developed. The junction points of $R_{c1}C_1$ and $R_{c2}C_2$ are connected to the input of an amplifier AP across the terminals of which the voltage $u_B$ develops. That voltage $u_B$ is proportional to the induction B in the current transformer core. Indeed, for frequencies having a period much lower than the characteristic time constant of the R-C circuits, the following relations are established:

$$u_{c1} = \frac{1}{R_{c1}C_1} \int u_s dt$$

$$u_{c2} = \frac{1}{R_{c2}C_2} \int u''_2 dt$$

$$U_B = u_{c1} + u_{c2} = \frac{1}{R_{c1}C_1} \int u_s dt + \frac{1}{R_{c2}C_2} \int u''_2 dt$$

Therefore, $u_B = \frac{1}{R_{c1}C_1} \times \frac{R_s}{(R_s + R_i)} \int u'_2 dt + \frac{1}{R_{c2}C_2} \int u''_2 dt$ Adjusting the parameters of those components so as to obtain:

$$\frac{1}{R_{c1}C_1} \times \frac{R_s}{(R_s + R_i)} = \frac{1}{R_{c2}C_2}$$

we have then:

$$u_B = \frac{1}{R_{c2}C_2} \int (u'_2 + u''_2) dt = \frac{1}{R_{c2}C_2} \int u_2 dt$$

Consequently, $$u_B = \frac{NA}{R_{c2}C_2} B, \text{ since } B = \frac{1}{NA} \int u_2 dt$$

That voltage $u_B$ which is proportional to the induction B in the transformer core, is thereafter amplified in amplifier AP by a factor of about 100. The amplified output signal $u_{BA}$ which is equal to $100 \times u_B$ feeds a comparator CP which compares that voltage $u_{BA}$ with the voltage levels $N_1$ and $N_2$ corresponding to a positive or negative induction of such a value as to govern a correction through the relay coils $R_A$ or $R_B$, which ever is the case. Therefore, upon detection of a voltage $u_{BA}$ greater than the positive level N, a current flows through the relay coil $R_B$ which then closes its contact $R_{BC}$ of the switching circuit C of FIG. 8. Similarly, where the voltage $u_{BA}$ is greater in negative value than the negative level $N_1$, the comparator feeds the coil $R_A$ which closes the contact $R_{AC}$ of the switching circuit C of FIG. 8. It is to be noted that the switching circuit C used here is identical to that of FIG. 8 and has the same function, which is the insertion of a high value resistance $R_2'$ at the transformer secondary. In the present embodiment, that circuit C, in series with the load $R_2$, is coupled to the detection part by the terminals $X_1''-X_2''$.

In the arrangement of FIG. 10, a supply source AL mounted on the current transformer secondary by means of the diode $D_8$ and the auxiliary current transformer $T_A$, provides amplififer AP, comparator CP and coils $R_A$ and $R_B$ with the power required for their proper operation. As illustrated, the voltage appearing at the secondary of the transformer $T_A$ is first rectified by the diode bridge $D_9$, then shaped by the zener diodes z, filtered by the capacitors CF and finally regulated by the electronic regulators REG. That arrangement ensures a completely autonomous operation of the detection part, without recourse to an external supply source.

FIGS. 11 and 12 illustrate test results on current transformers provided without control circuits and with control circuits, respectively. It is to be noted that the recording of currents $i_1$ and $i_2$ has been effected on different scales. The transformers have been subjected to a current of 1720 A rms for one second with an asymmetrical current having a time constant of 90 ms. As seen, the transformers not provided with a control circuit (FIG. 11) saturate shortly after the incoming of the fault current, that saturation being defined as the moment from which the error or difference between the primary or secondary currents reaches 10%. As shown in FIG. 12, the error has always remained lower than 5% during the whole test period in the case of the transformer equipped with the control circuit described above, and the induction B is held below saturation, in the latter case.

Summing up, one of the main advantages of the control circuit in accordance with the present invention resides in a substantial decrease in the cost of the current transformers, particularly those used along the very high power transmission lines. A further advantage consists in the easiness of installation of the control circuit onto any current transformer already on duty and which are open to saturation in the event of major faults on those lines. Another advantage is in the fact that the control circuit allows a substantial increase in the induction dynamic range of current transformers as a result of a decrease in the peak to peak amplitude of the induction in the core, thereby increasing its transformation capacity by 3 or 4 times. The latter characteristic offers accrued economical advantages since the cost of a current transformer is directly related to its capacity and therefore to the core section in terms of the quantity of iron materials used.

I claim:

1. A circuit for controlling induction in a current transformer having a nominal load at its secondary, useful in maintaining said induction below its saturation level in the presence of a primary current having an asymetrical component, comprising:
- detection means coupled with the secondary of said current transformer for detecting an increase in said induction in the transformer;
- an auxiliary load having a high resistive value and connected to the secondary of said transformer; and
- switching means controlled by said detection means so as to insert, in series with the secondary of the transformer and said nominal load, said auxiliary load when the polarity of the current flowing through said switching means becomes opposite to the polarity of said asymetrical component of said primary current.

2. A control circuit as claimed in claim 1, characterized in that said detection means are mounted in shunt across the secondary winding of the transformer so as to detect an increase in voltage or in current corresponding to an increase in said induction in the transformer.

3. A control circuit as claimed in claim 2, characterized in that said detection means comprise a set of relay coils respectively mounted in parallel and so as to detect a change in the intensity of the secondary current in accordance with the polarity of the latter.

4. A control circuit as claimed in claim 3, characterized in that an inductance is connected in series with said set of parallel relay coils.

5. A control circuit as claimed in claim 4, characterized in that each relay coil of said set actuates a respective contact to allow insertion of said auxiliary charge in series with the transformer secondary, upon detection by the relay coil of currents above a predetermined threshold value.

6. A control circuit as claimed in claim 5, characterized in that said switching means comprise a semi-conductor switch element having a trigger electrode, said element being coupled in parallel with said auxiliary load and connected to each of said contacts of the relay coils to insert said auxiliary load in series with the transformer secondary when one of said contacts is closed and to short-circuit said auxiliary load when the contacts are open.

7. A control circuit as claimed in claim 6, characterized in that a capacitor is connected between the trigger electrode of the switch element and said auxiliary load.

8. A control circuit as claimed in claim 7, characterized in that said auxiliary load, said switch element and said capacitor are mounted within a diode bridge.

9. A control circuit useful in maintaining the induction in a current transformer at a level below its saturation level, in presence of a primary current having an asymetrical component, comprising:
- a detection unit mounted in shunt on the secondary of said transformer for detecting an increase in current or voltage corresponding to the induction of said transformer;
- an auxiliary load having a high resistive value;
- a diode bridge coupled in series with the transformer secondary and within which is mounted said auxiliary load;
- a controlled conduction element connected in parallel with said auxiliary load, within said diode bridge; and
- a switching unit controlled by said detection unit to govern conduction of said conduction element so as to set said auxiliary load in series with the transformer secondary when the polarity of the induced current becomes reversed to the polarity of said asymetrical component of said primary current.

10. A control circuit as claimed in claim 9, characterized in that said detection unit comprises an inductance connected in series with current detection elements, parallely interconnected, said current detecting elements actuating each one switching element when the value of the current flowing through said inductance overpasses a predetermined threshold intensity.

11. A control circuit as claimed in claim 10, wherein said detecting element comprises relay coils and wherein the switching elements are the corresponding contacts.

12. A control circuit as claimed in claim 10, wherein said conduction element is a thyristor having a trigger electrode connected to the switching elements and to a voltage divider mounted in parallel with said auxiliary load.

13. A control circuit as claimed in claim 9, characterized in that the switching elements are mounted in shunt on said diode bridge and each switching element comprises a diode in series with the latter.

14. A circuit for controlling the induction in current transformers and capable of maintaining said induction below its saturation level, in presence of a primary current having an asymetrical component, comprising:
- a detection part mounted in shunt across the secondary of said current transformer, and including an inductance and two intensity detectors connected in parallel with one another and in series with said inductance, each detector being coupled in series with a diode so as to allow a flow of a secondary current through one of said detectors and said inductance;
- a load having a high resistive value;
- a switching part connected in series with the secondary of said current transformer and including a diode bridge, a conduction controlled element having a trigger electrode and connected in parallel with said load and a voltage divider mounted in parallel with said load and including a capacitance connected to said trigger electrode; said conduction controlled element, said load and said voltage divider being mounted within said diode bridge; said detection part further comprising two switching elements each being controlled by one of said detectors of the detection part, said switching elements being connected to the trigger electrode of said conduction controlled element and to said capacitance, so as to insert in series with the secondary of the current transformer said load upon detection of a current of a value above a predetermined threshold value by said detection part, and when the polarity of the current induced at the secondary becomes opposite to the polarity of said asymetrical component of the primary current.

15. A control circuit as claimed in claim 14, wherein said detectors comprise relay coils and said switching elements comprise contacts operatively associated with said relay coils.

16. A control circuit as claimed in claim 14, wherein said conduction controlled element is a thyristor.

17. A control circuit as claimed in claim 16, wherein said diodes are connected in series with said thyristor.

18. A circuit for controlling induction in current transformers so as to maintain that induction below its saturation level in presence of a primary current having an asymetrical component, comprising:

detection means coupled to the secondary of said current transformer for detecting an increase in said induction in the transformer, said detection means including means for developing a voltage proportional to said induction and means for comparing said proportional voltage with predetermined threshold voltage levels;

an auxiliary load of a high resistive value at the transformer secondary; and switching means controlled by said detection means for inserting in series with the transformer secondary said auxiliary load when said proportional voltage overpasses in value said threshold voltages of said comparing means.

19. A control circuit as claimed in claim 18, characterized in that said means for developing a proportional voltage comprise integrating means connected to a low resistive value element mounted in series with the transformer secondary, and amplifying means coupled to said integrating means for amplifying said voltage proportional to said induction.

20. A control circuit as claimed in claim 18, further comprising relay coils coupled to the output of said comparing means and individually set into operation when said proportional voltage goes above the predetermined threshold voltages, said coils actuating said switching means for inserting said auxiliary load in series with the transformer secondary.

21. A control circuit as claimed in claim 20, characterized in that each relay coil controls a respective contact, and in that said switching means include a switching element having a trigger electrode and mounted in parallel with said auxiliary load and connected to each contact of said relay coils so as to insert said auxiliary load in series with the transformer secondary when one of the contacts is closed and to short-circuit said auxiliary load when said contacts are open.

22. A control circuit as claimed in claim 21, characterized in that said auxiliary load and said switching element are both mounted within a diode bridge.

23. A control circuit as claimed in claim 18, further comprising a power supply source for said detection means, that supply source being connected in series with the secondary of said transformer.

24. A control circuit as claimed in claim 23, characterized in that the power supply source includes means for regulating the power supplied to said detection means.

* * * * *